//

2,982,791

RECOVERY OF D-ARABITOL FROM FERMENTATION BROTHS

William Denis Podmore, Lower Bebington, Wirral, and Maxwell Graham Bennett, Tadworth, England, assignors to Commercial Solvents (Great Britain) Limited, Bromborough Port, England, a British company No Drawing. Filed Jan. 29, 1958, Ser. No. 711,770

Claims priority, application Great Britain Feb. 13, 1957

3 Claims. (Cl. 260—637)

The present invention relates to the recovery of polyhydric alcohols and in particular to the recovery of D-arabitol from fermentation broths containing them.

It is known that certain micro-organisms, for example osmophilic yeasts known as *Saccharomyces rouxii* and *Saccharomyces mellis* can produce D-arabitol during the fermentation of suitable nutrient media. Other polyhydric alcohols such as glycerol or erythritol are also frequently formed during these fermentations. Such fermentations are described, for example, in published work by Spencer and Sallans in Canadian Journal of Microbiology (1956) 2, pages 72–79. Sources of the micro-organisms and methods for the isolation of suitable cultures of these micro-organisms are described in this publication. The organisms *Saccharomyces rouxii* and *Saccharomyces mellis* are described in the book "The Yeasts, a Taxonomic Study" by Lodder and Kreger-van-Rij, published by Interscience Publishers.

It has hitherto been found difficult to recover D-arabitol from such fermentations in a relatively pure form, particularly when an impure and highly coloured source of carbohydrate, such as molasses, is used in the fermentation medium.

It is an object of this invention to provide a method whereby the D-arabitol may be recovered from fermentation broths containing it.

Accordingly, the present invention is a method for the recovery of D-arabitol from fermentation broths containing it comprising reducing the volume of the fermentation broth by the removal of water, extracting the concentrate thus formed with normal or isobutyl alcohol and recovering the D-arabitol from the alcoholic extract.

It is preferred that the fermentation broth shall be obtained by the fermentation of a suitable nutrient medium by the organism *Saccharomyces rouxii* or *Saccharomyces mellis*.

The volume of the fermentation broth may be reduced by any method known in the art providing that care is taken to prevent impairment of the yield of the D-arabitol. For example, the broth may be evaporated at low temperatures under reduced pressure, in order to prevent charring of the broth contents. It is preferred, however, that the removal of water be accomplished by azeotropic distillation in the presence of the butyl alcohol which forms an azeotrope with water, wherein the water is removed as the water/alcohol azeotrope. For example, the fermentation broth may be mixed with normal butyl alcohol and the mixture distilled through a distillation column from the top of which is removed a water/alcohol azeotrope. When the desired quantity of water has been removed, for example, when the fermentation broth has been reduced to about one third of its original volume or when substantially the whole of the water has been removed the distillation may then be stopped and the residual layer and alcohol may be further agitated together, if desired. The mixture is then allowed to separate and the alcoholic layer is removed before cooling and may be concentrated. The residue may then be extracted with further batches of alcohol if desired. On cooling the D-arabitol crystallizes out from the alcohol in good yield and in relatively high purity.

It has been found desirable to complete the extraction at temperatures above 103° C. since this is the temperature at which D-arabitol melts and the extraction is more rapidly accomplished. This may be accomplished by removing substantially all the water from the fermentation broth, for example by azeotropic distillation and then by boiling the residue with the normal- or iso-butyl alcohol.

While it is preferred to use normal butyl alcohol for the purpose of extracting the concentrated fermentation broth, isobutyl alcohol may also be used since this also has a boiling point above 103° C. and forms an organic layer in the presence of water, for example in the fermentation broth; which enables the alcoholic and residual layers to be readily separated and the alcoholic layer containing D-arabitol to be recovered.

The D-arabitol may be recovered from the alcoholic extract by allowing the extract to cool if necessary after concentration in volume, whereupon crystals of D-arabitol are precipitated. Where molasses has been used in the fermentation medium, the crystals tend to be coloured. These may be further purified by washing, for example, with acetone, and the colour improved by re-crystallization from butanol or methyl alcohol, in the presence of a small amount of active carbon, if desired.

When the fermentation broth contains glycerol, this is also extracted by the alcohol and may be recovered from the mother liquor after the D-arabitol has crystallized out, by any suitable means, for example by steam distillation under reduced pressure after removal of the alcohol. Alternatively, the glycerol may be recovered before the alcohol extraction by the same method. If the latter course is adopted it is advisable to remove the cells of the micro-organisms by filtration before the steam distillation step.

It is preferred to extract the fermentation broth with the alcohol before recovering the glycerol.

The following example is given to illustrate one method of carrying out the present invention.

*Example*

The fermentation medium containing 30% weight/volume high test molasses, 0.075 weight/volume urea and 0.375 volume/volume corn steep liquor together with 0.022% volume/volume invertase enzyme was fermented with a D-arabitol and glycerol-producing osmophilic strain of Saccharomyces isolated from brood comb pollen for eight days at 35° C. to 37° C., with aeration and agitation. To the fermentation whole broth were then added 1.5 parts of n-butanol, based on the amount of water present, and the mixture was distilled and a water/n-butanol azeotrope was taken from the top of the column until the fermentation broth was reduced to about one third of its original volume. The mixture of n-butanol and concentrated fermentation broth remaining was allowed to separate into organic and aqueous layers and the organic layer was separated while still hot. On cooling the D-arabitol crystallized out and was separated from the mother liquor, washed with acetone and recrystallized from n-butanol in the presence of a small amount of active carbon. The product was a white crystalline solid of melting point about 102° C.

The mother liquor from the first crystallization was subjected to steam distillation under reduced pressure to recover the glycerol.

The yield of D-arabitol was 45% by weight and the yield of glycerol was 6.0% by weight, based upon the sugar content of the mash before inversion. The estimations were carried out by the periodate oxidation method.

We claim:

1. A method for the recovery of D-arabitol from fermentation broth containing same comprising adding to the broth an alcohol selected from the group consisting of normal- and iso-butyl alcohol, heating the resulting mixture, removing water from said mixture as the alcohol/water azeotrope, and thereafter recovering D-arabitol from the remaining alcoholic extract.

2. A method according to claim 1 wherein the water is removed until the broth is reduced to about ⅓ its original volume, the aqueous and alcoholic layers are then separated while hot, and D-arabitol is recovered from the alcoholic layer by crystallization.

3. A method as claimed in claim 1 wherein the fermentation broth is obtained by fermenting a nutrient medium with a D-arabitol producing organism selected from the group consisting of *Saccharomyces rouxii* and *Saccharomyces mellis*.

References Cited in the file of this patent

UNITED STATES PATENTS

| | | |
|---|---|---|
| 2,410,518 | Neuberg | Nov. 5, 1946 |
| 2,461,220 | Lorand | Feb. 8, 1949 |
| 2,793,981 | Spencer et al. | May 28, 1957 |